(12) United States Patent
Pyo et al.

(10) Patent No.: US 12,453,022 B2
(45) Date of Patent: Oct. 21, 2025

(54) DISPLAY DEVICE

(71) Applicant: LG ELECTRONICS INC., Seoul (KR)

(72) Inventors: Jonggil Pyo, Seoul (KR); Seunggyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 18/097,030

(22) Filed: Jan. 13, 2023

(65) Prior Publication Data

US 2023/0240026 A1     Jul. 27, 2023

(30) Foreign Application Priority Data

Jan. 26, 2022   (KR) .................. 10-2022-0011774

(51) Int. Cl.
    *H05K 5/02*      (2006.01)
    *H10K 59/35*     (2023.01)
    *H10K 102/00*    (2023.01)

(52) U.S. Cl.
    CPC ........... *H05K 5/0217* (2013.01); *H10K 59/35* (2023.02); *H10K 2102/311* (2023.02)

(58) Field of Classification Search
    CPC ..................... H05K 5/0017; H05K 5/0217
    (Continued)

(56) References Cited

U.S. PATENT DOCUMENTS

2014/0198465 A1   7/2014  Park
2014/0376163 A1  12/2014  Song et al.
(Continued)

FOREIGN PATENT DOCUMENTS

CN   103941456   7/2014
CN   113327514   8/2021
(Continued)

OTHER PUBLICATIONS

European Patent Office Application Serial No. 23151060.3, Search Report dated Jun. 22, 2023, 6 pages.

(Continued)

*Primary Examiner* — Hung S. Bui
(74) *Attorney, Agent, or Firm* — LEE, HONG, DEGERMAN, KANG & WAIMEY

(57) ABSTRACT

A display device is provided. The display device includes: a flexible display panel; a flexible plate disposed at a rear of the display panel, and coupled to the display panel; a driving module coupled to a rear of the plate and having a slider that linearly reciprocates; a first wing elongated with a first end being coupled to the slider and a second end being coupled to the rear of the plate, and having a pivot shaft disposed adjacent to the first end between the first end and the second end; a first wing bracket fixed to the rear of the plate at a position adjacent to the pivot shaft of the first wing, and coupled to the pivot shaft of the first wing; a second wing elongated with a first end being coupled to the slider and a second end being coupled to the rear of the plate, and having a pivot shaft disposed adjacent to the first end between the first end and the second end, to be symmetric to the first wing with respect to the slider; and a second wing bracket fixed to the rear of the plate at a position adjacent to the pivot shaft of the second wing, and coupled to the pivot shaft of the second wing.

14 Claims, 29 Drawing Sheets

(58) Field of Classification Search
USPC .......................................... 361/807, 809, 810
See application file for complete search history.

(56) References Cited

U.S. PATENT DOCUMENTS

| | | |
|---|---|---|
| 2015/0223358 A1 | 8/2015 | Nam et al. |
| 2018/0259160 A1 | 9/2018 | Chen et al. |

FOREIGN PATENT DOCUMENTS

| | | | |
|---|---|---|---|
| KR | 20140117182 A | * 10/2014 | ............... G09F 9/00 |
| KR | 10-2015-0081225 | 7/2015 | |
| KR | 10-2015-0092428 | 8/2015 | |
| KR | 10-2015-0134825 | 12/2015 | |
| KR | 10-2016-0036805 | 4/2016 | |
| KR | 10-1720178 | 3/2017 | |
| KR | 10-2017-0078984 | 7/2017 | |
| KR | 10-2021-0056094 | 5/2021 | |

OTHER PUBLICATIONS

Korean Intellectual Property Office Application No. 10-2022-0011774, Notice of Allowance dated Jul. 9, 2024, 2 pages.

* cited by examiner

DISPLAY DEVICE

CROSS-REFERENCE TO RELATED APPLICATION(S)

Pursuant to 35 U.S.C. § 119(a), this application claims the benefit of earlier filing date and right of priority to Korean Patent Application No. 10-2022-0011774, filed on Jan. 26, 2022, the contents of which are hereby incorporated by reference herein in its entirety.

BACKGROUND OF THE INVENTION

1. Field of the Invention

The following description relates to a display device, and more particularly to a display device capable of changing a curvature of a display panel.

2. Description of the Related Art

With the development of the information society, there have been growing demands for various types of display devices, and in order to meet these demands, various display devices, such as a liquid crystal display (LCD), an electroluminescent display (ELD), a vacuum fluorescent display (VFD), an organic light emitting diode (OLED) panel, etc., have been studied and used recently.

Among these display devices, the OLED panel may display images by depositing a self light-emitting organic layer on a substrate, on which transparent electrodes are formed. The OLED panel is thin and flexible, and many studies have been conducted on the structural characteristics of a display device having the OLED panel.

SUMMARY OF THE INVENTION

It is an object of the present disclosure to solve the above and other problems.

It is another object of the present disclosure to provide a structure for freely changing a curvature of a display panel.

It is yet another object of the present disclosure to provide a mechanism for freely changing a curvature of a display.

It is yet another object of the present disclosure to provide a structure for improving stability of a driving mechanism.

It is yet another object of the present disclosure to provide a display device which is curved with a constant curvature.

It is yet another object of the present disclosure to provide a display device capable of improving noise and/or vibrations generated during driving.

In accordance with an aspect of the present disclosure, the above and other objects can be accomplished by providing a display device including: a flexible display panel; a flexible plate disposed at a rear of the display panel, and coupled to the display panel; a driving module coupled to a rear of the plate and having a slider that linearly reciprocates; a first wing elongated with a first end being coupled to the slider and a second end being coupled to the rear of the plate, and having a pivot shaft disposed adjacent to the first end between the first end and the second end; a first wing bracket fixed to the rear of the plate at a position adjacent to the pivot shaft of the first wing, and coupled to the pivot shaft of the first wing; a second wing elongated with a first end being coupled to the slider and a second end being coupled to the rear of the plate, and having a pivot shaft disposed adjacent to the first end between the first end and the second end, to be symmetric to the first wing with respect to the slider; and a second wing bracket fixed to the rear of the plate at a position adjacent to the pivot shaft of the second wing, and coupled to the pivot shaft of the second wing, wherein the driving module includes: a front bracket fixed to the rear of the plate; a rear bracket disposed opposite the front bracket; a lead screw elongated from the front bracket to the rear bracket, rotatably coupled to the front bracket or the rear bracket, and rotating to move the slider; a center plate disposed between the rear bracket and the slider; a first elastic member connecting the center plate and the first wing; and a second elastic member connecting the center plate and the second wing.

Effects of the Invention

According to at least one of the embodiments of the present disclosure, a structure for freely changing a curvature of a display panel may be provided.

According to at least one of the embodiments of the present disclosure, a mechanism for freely changing a curvature of a display may be provided.

According to at least one of the embodiments of the present disclosure, a structure for improving stability of a driving mechanism may be provided.

According to at least one of the embodiments of the present disclosure, a display device which is curved with a constant curvature may be provided.

According to at least one of the embodiments of the present disclosure, a display device capable of improving noise and/or vibrations generated during driving may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DETAILED DESCRIPTION OF THE PREFERRED EMBODIMENTS

Figure 1:
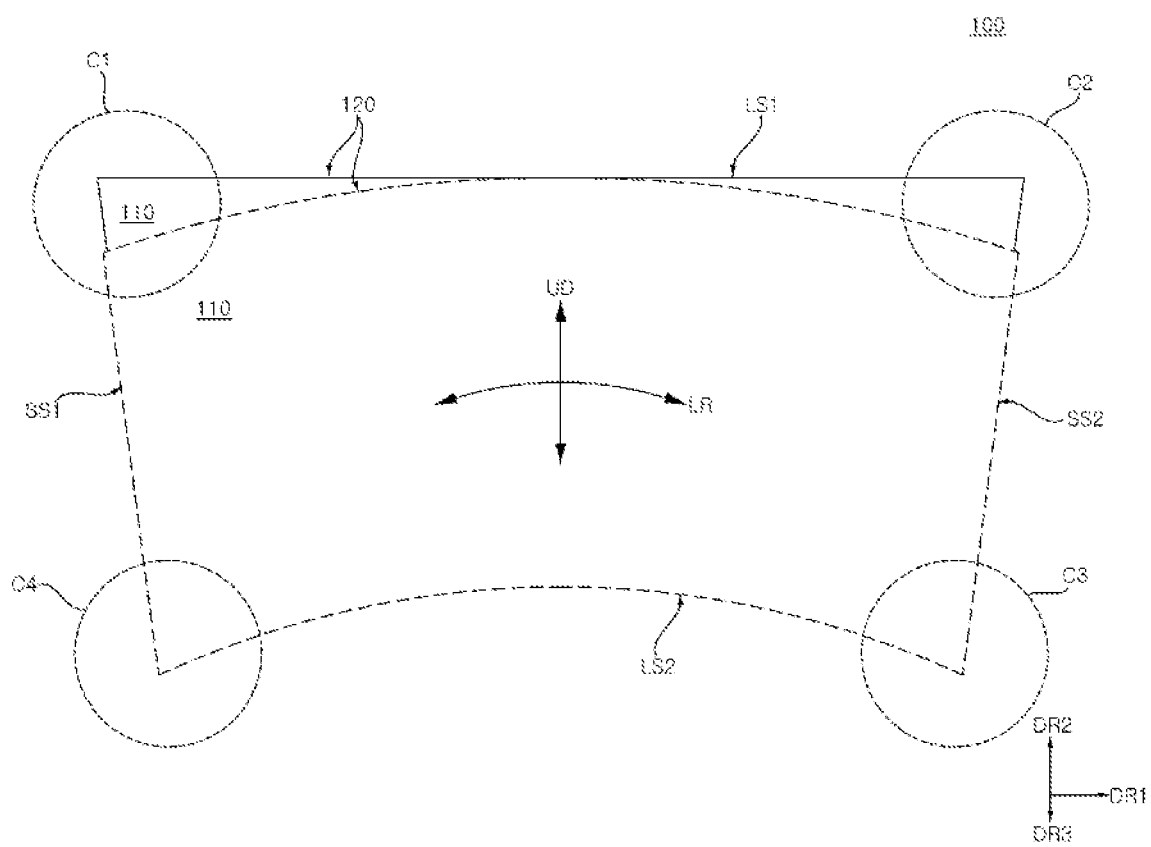
FIGS. 1 to 29 are diagrams illustrating examples of a display device according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The terms "module" and "unit" for elements used in the following description are given simply in view of the ease of the description, and do not have a distinguishing meaning or role. It will be noted that a detailed description of known arts will be omitted if it is determined that the detailed description of the known arts can obscure the embodiments of the invention. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "comprise", 'include", "have", etc. when used in this specification, specify the presence of stated features, integers, steps, operations, elements, components, or combinations of them but do not preclude the presence or addition of one or more other features, integers, steps, operations, elements, components, or combinations thereof.

Hereinafter, a display panel will be described by using an Organic Light Emitting Diode (OLED) as an example, but a display panel applicable to the present disclosure is not limited to the OLED panel.

In addition, in the following description, the display device may include a first long side LS1, a second long side LS2 opposite to the first long side LS1, a first short side SS1 adjacent to one end of the first long side LS1 and the second long side LS2, and a second short side SS2 opposite to the first short side SS1.

Here, an area of the first short side SS1 may be referred to as a first side area; an area of the second short side SS2 may be referred to as a second side area opposite to the first side area; an area of the first long side LS1 may be referred to as a third side area adjacent to the first side area and the second side area, and disposed between the first side area and the second side area; and an area of the second long side LS2 may be referred to as a fourth side area adjacent to the first side area and the second side area, disposed between the first side area and the second side area, and opposite to the third side area.

For convenience of explanation, it is illustrated and described that the first and second long sides LS1 and LS2 are longer than the first and second short sides SS1 and SS2, but there may also be a case where the lengths of the first and second long sides LS1 and LS2 may be approximately equal to the lengths of the first and second short sides SS1 and SS2.

In the following description, a first direction DR1 may be a direction parallel to the first and second long sides LS1 and LS2 of the display device, and a second direction DR2 may be a direction parallel to the first and second short sides SS1 and SS2 of the display device. A third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side or a surface, on which the display device displays an image, may be referred to as a front side or a front surface. When the display device displays the image, a side or a surface, at which the image may not be viewed, may be referred to as a back side or a back surface. When the display device is viewed from the front side or the front surface, the first long side LS1 may be referred to as an upper side or an upper surface. Likewise, the second long side LS2 may be referred to as a lower side or a lower surface; the first short side SS1 may be referred to as a left side or a left surface; and the second short side SS2 may be referred to as a right side or a right surface.

The first long side LS1, the second long side LS2, the first short side SS1, and the second short side SS2 may be referred to as edges of the display device. Further, positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Here, a direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Referring to FIG. 1, a plate 120 may be flexible. For example, the plate 120 may be a metal plate. The plate 120 may be referred to as a flexible plate 120, a frame 120, or a module cover 120. A display panel 110 may be disposed on a front side or a front surface of the plate 120. The display panel 110 may be flexible. For example, the display panel 110 may be an OLED panel.

The display panel 110 may be provided on a front surface of a display device 100 and may display an image. The display panel 110 may divide the image into a plurality of pixels and may output the image while controlling color, brightness, and chroma of the respective pixels. The display panel 110 may generate light corresponding to red, green, or blue color in response to a control signal.

The display device 100 may have a variable curvature. The display device 100 has the left and right sides which may be moved forward. For example, when an image is viewed from the front side of the display device 100, the display device 100 may be curved concavely. In this case, the plate 120 may be curved with the same curvature as the display panel 110. Alternatively, the display panel 110 may be curved corresponding to the curvature of the plate 120.

Figure 2:
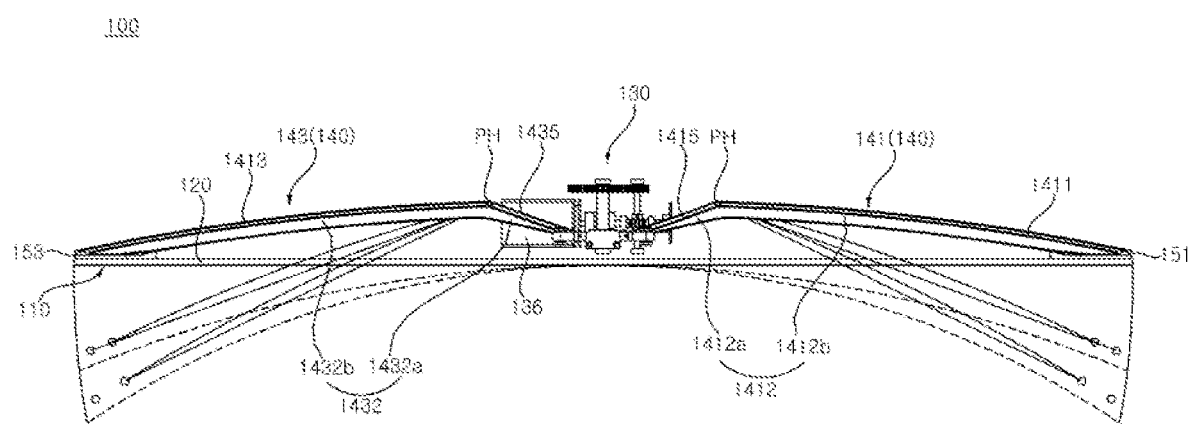
Figure 3:
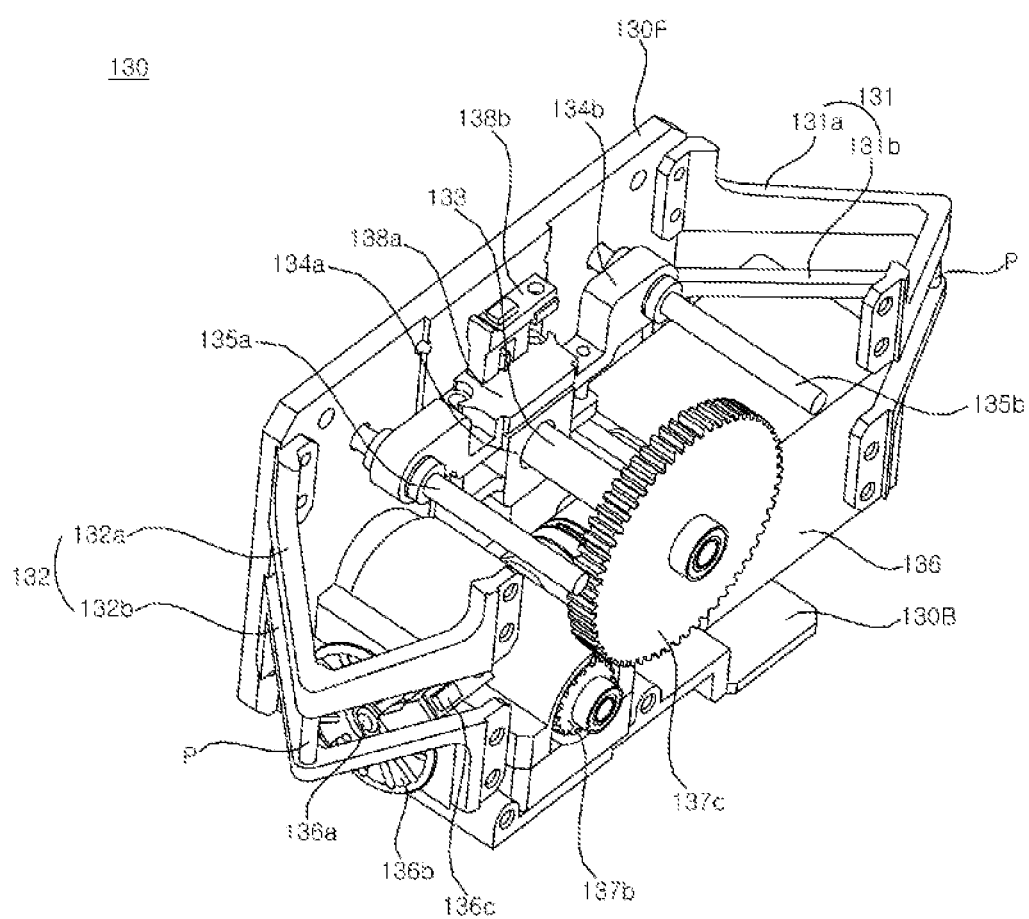

Referring to FIGS. 2 and 3, the plate 120 may be coupled to the rear of the display panel 110. The plate 120 may support the rear of the display panel 110. The plate 120 may have a shape corresponding to the display panel 110.

A driving module 130 may be coupled to the rear of the plate 120. The driving module 130 may include a front bracket 130F, a base 130B, and wing brackets 131 and 132.

The front bracket 130F may be coupled or fixed to a rear side or a rear surface of the plate 120. The front bracket 130F may be in a shape of a rectangular flat plate. The base 130B may be coupled or fixed to the front bracket 130F and may form the bottom of the driving module 130.

There may be a plurality of wing brackets 131 and 132. The plurality of wing brackets 131 and 132 may include a first wing bracket 131 and a second wing bracket 132.

The first wing bracket 131 may be coupled to the front bracket 130F or may be fixed to the front bracket 130F and may be disposed opposite the second wing bracket 132. The second wing bracket 132 may also be coupled or fixed to the front bracket 130F.

The wing brackets 131 and 132 may have a V-shape. The wing brackets 131 and 132 may be a pair of brackets 131 and 132. The wing brackets 131 and 132 may include upper brackets 131a and 132a and lower brackets 131b and 132b which are arranged in parallel. A pin P may be disposed between the upper brackets 131a and 132a and the lower brackets 131b and 132b, and may connect vertices of the upper brackets 131a and 132a and the lower brackets 131b and 132b.

The first wing 143 may be pivotally coupled to the first wing bracket 131, and the second wing 141 may be pivotally coupled to the second wing bracket 132. The first wing 143 may be axisymmetric to the second wing 141 with respect to a driving unit 130.

Figure 4:
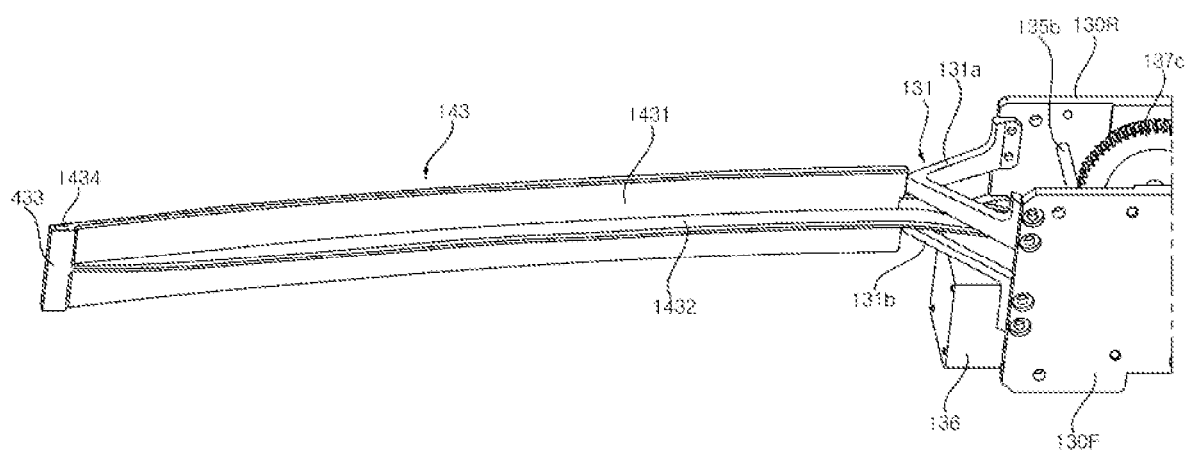
Figure 5:
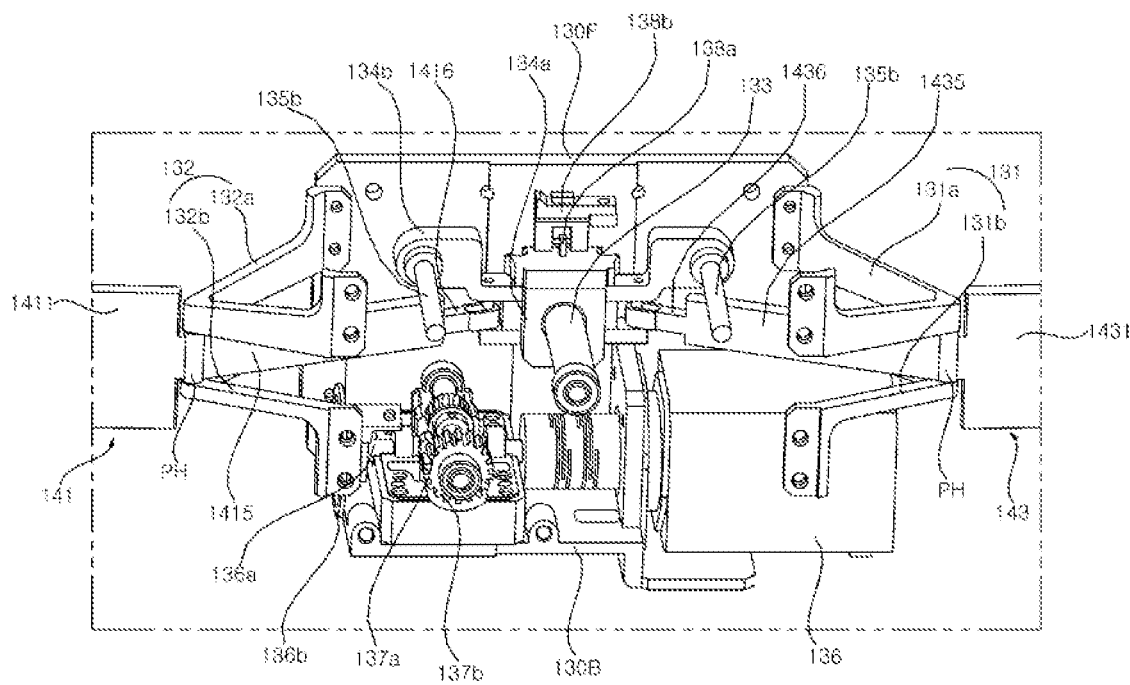

Referring to FIGS. 4 and 5, the first wing 143 may be pivotally connected to the first wing bracket 131. A description of the first wing 143 and the first wing bracket 131 may be applied to a description of the second wing 141 and the second wing bracket 132. The first wing 143 may include a wing plate 1431, a rib 1432, a wing end 1433, a pivot shaft PH, and a lever 1435.

The wing plate 1431 may be an elongated plate. The lever 1435 may extend from one end of the wing plate 1431. The lever 1435 may be an elongated plate. A length of the lever 1435 may be smaller than a length of the wing plate 1431, and a width of the lever 1435 may be smaller than a width of the wing plate 1431. A thickness of the wing plate 1431 may be substantially equal to a thickness of the lever 1435.

Referring to FIGS. 4 and 5 along with FIG. 2, ribs 1412 and 1432 may be elongated in a longitudinal direction of the wing plates 1411 and 1431 and the levers 1415 and 1435, to be formed on one surface of the wing plates 1411 and 1431 and the levers 1415 and 1435. The ribs 1412 and 1432 may be disposed perpendicular to a width direction of the wing plates 1411 and 1431 and the levers 1415 and 1435. The wing plates 1411 and 1431 may be gently curved, and the levers 1415 and 1435 may be bent to be connected to the wing plates 1411 and 1431. The ribs 1412 and 1432 may include first ribs 1412a and 1432a and second ribs 1412b and 1432b. A width of the first ribs 1412a and 1432a may gradually decrease away from the pivot shaft PH. A width of the second ribs 1412b and 1432b may be substantially equal to the width of the first ribs 1412a and 1432a disposed adjacent to the pivot shaft PH.

In FIG. 5, the pivot shaft PH of the wings 141 and 143 may be pivotally connected to the pin P of the wing brackets 131 and 132. The pin P may be inserted into the pivot shaft PH of the wings 141 and 143. The wings 141 and 143 may rotate or pivot about the pin P at the wing brackets 131 and 132. A thickness of the pivot shaft PH may be greater than a thickness of the wing plates 1411 and 1431 and/or the levers 1415 and 1435, thereby improving structural rigidity of the wing 140 during driving.

Figure 6:
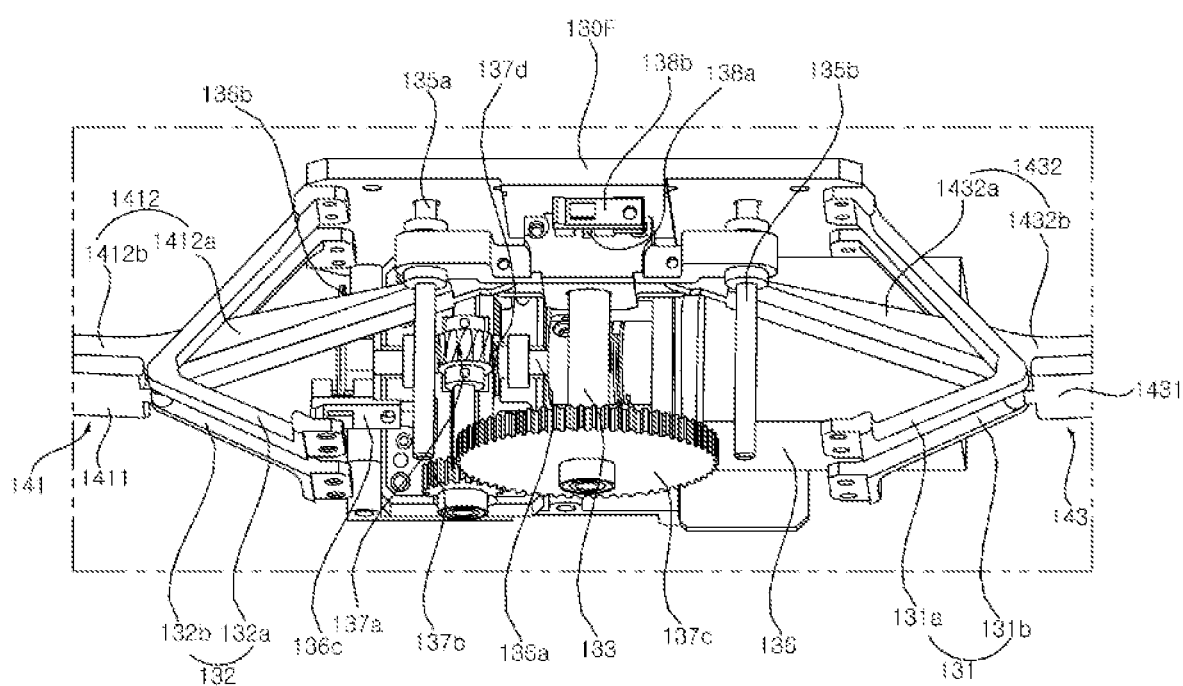

Referring to FIGS. 5 and 6, a lead screw 133 may be rotatably mounted in the front bracket 130F. For example, the lead screw 133 may be elongated and has a screw thread formed on an outer surface thereof. The lead screw 133 may be inserted into a slider 134a. The slider 134a may be coupled by screw thread coupling to the lead screw 133. When the lead screw 133 is rotated, the slider 134a may reciprocate in a longitudinal direction of the lead screw 133.

A slider guide 134b may be fixed onto the slider 134a. The slider guide 134b may be moved together with the slider 134a. Guide shafts 135a and 135b may be coupled or fixed to the front bracket 130F. The guide shafts 135a and 135b may be parallel to the lead screw 134b. The guide shafts 135a and 135b may include a first guide shaft 135a and a second guide shaft 135b. The first guide shaft 135a may be disposed opposite to the second guide shaft 13b with respect to the lead screw 133. The guide shafts 135a and 135b may be inserted into the slider guide 134b. Accordingly, by the rotation of the lead screw 133, the slider 134a may stably reciprocate in the longitudinal direction of the lead screw 133.

A motor 136 may be mounted on the base 130B. A rotating shaft 136a of the motor 136 may be perpendicular to the longitudinal direction of the lead screw 133. The motor 136 and the rotating shaft 136a of the motor 136 may be disposed between the lead screw 133 and the base 130B. A worm 137d may be fixed to the rotating shaft 136a of the motor 136 and may rotate together with the rotating shaft 136a. A worm gear 137a may be engaged with the worm 137d. A transmission gear 137b may be coaxially rotated with the worm gear 137a. A driving gear 137c may be fixed to one end of the lead screw 133 to be rotated together with the lead screw 133. The driving gear 137c may be engaged with the transmission gear 137b. A diameter of the driving gear 137c may be greater than a diameter of the transmission gear 137b.

A disc indicator 136b may be fixed at a position adjacent to an end of the rotating shaft 136a of the motor 136. A sensor 136c may be fixed to the base 130B or the wing bracket 132 at a position adjacent to the disc indicator 136b, thereby sensing the number and/or amount of revolutions of the motor 136. A pin indicator 138a may be fixed onto the slider 134a or the slider guide 134b. A sensor 138b may be fixed to the front bracket 130F and may sense approach of the pin indicator 138a, thereby sensing a start point and/or a terminal point of the slider 134a.

Figure 7:
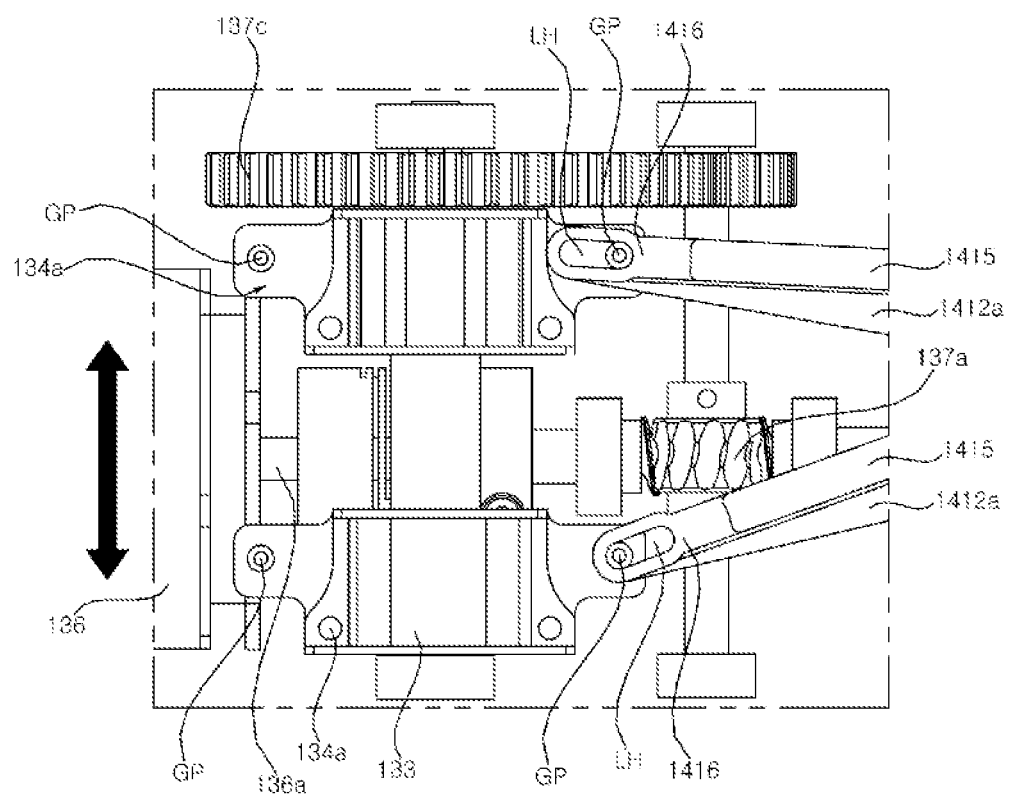
Figure 8:
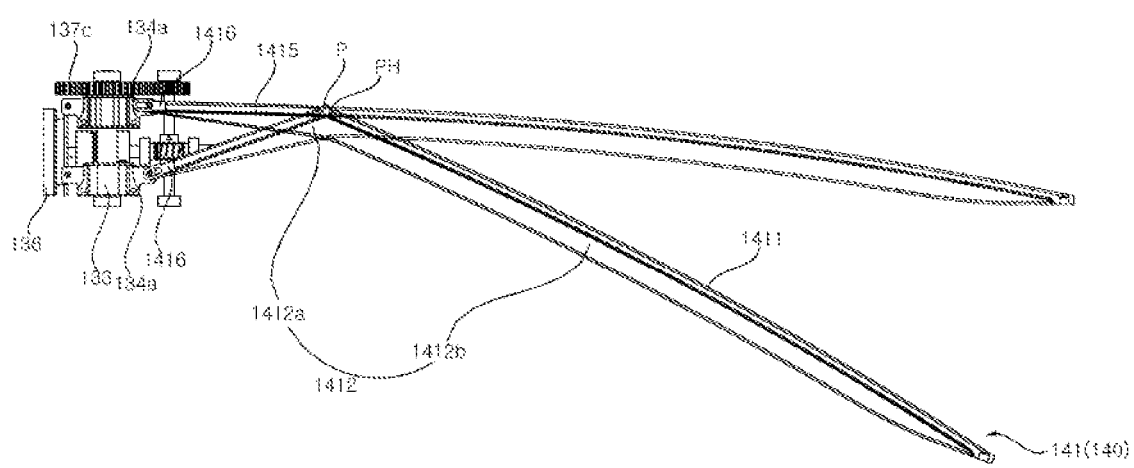

Referring to FIGS. 7 and 8, the wing 141 may include a connecting rod 1416. The connecting rod 1416 may be fixed to the lever 1415 or may extend from the lever 1415. The connecting rod 1416 may be connected to the slider 134a. The connecting rod 1416 may be pivotally connected to the slider 134a. The connecting rod 1416 may have a long hole LH. The long hole LH may be formed at an end of the connecting rod 1416 adjacent to the slider 134a. The slider 134a may have a connecting pin GP. The connecting pin GP may have a cylindrical shape. A diameter of the connecting pin GP may be substantially equal to a width of the long hole LH.

As the lead screw 133 is rotated, the slider 134a may reciprocate in the longitudinal direction of the lead screw 133. The lever 1415 connected to the slider 134a by the connecting rod 1416 may be moved together with the slider 134a, and the wing 141 may pivot about the pivot shaft PH. In this case, the connecting pin GP may be moved within the long hole LH.

Figure 9:
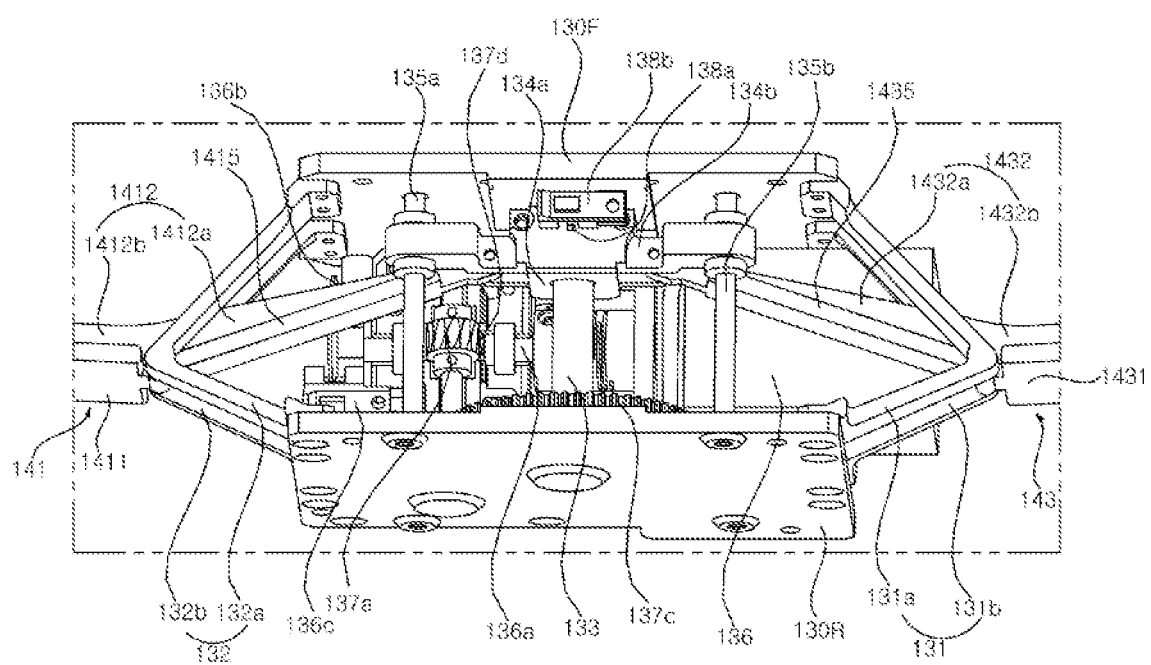

Referring to FIG. 9, a rear bracket 130R may be coupled to the wing brackets 131 and 132. The rear bracket 130R may be disposed opposite the front bracket 130F. The lead screw 133 may connect the front bracket 130F and the rear bracket 130R.

The guide shafts 135a and 135b may be coupled to the front brackets 130F and the rear bracket 130R. A length of the lead screw 133 and/or a length of the guide shafts 135a and 135b may correspond to a distance between the front bracket 130F and the rear bracket 130R.

The wing brackets 131 and 132 may be coupled to the front bracket 130F and the rear bracket 130R. A first end of the wing brackets 131 and 132 may be coupled or fixed to the front bracket 130F, and a second end of the wing brackets 131 and 132 may be coupled or fixed to the rear bracket 130R.

Figure 10:
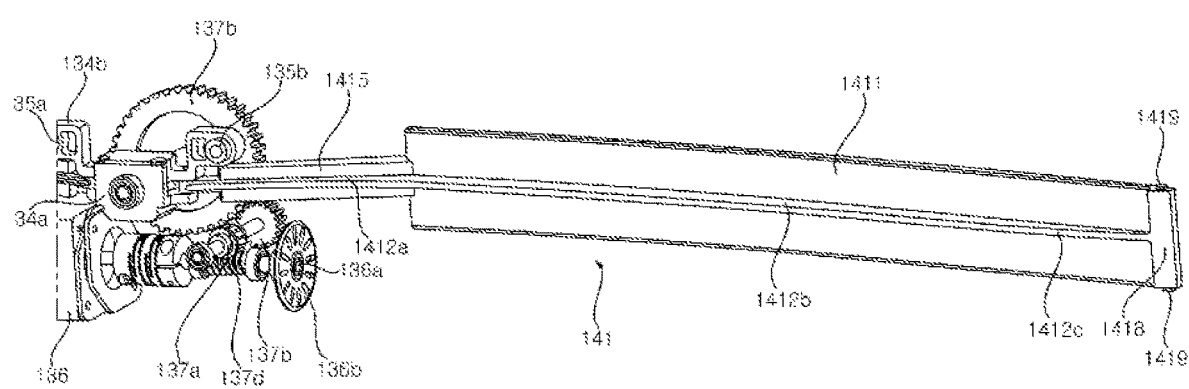
Figure 11:
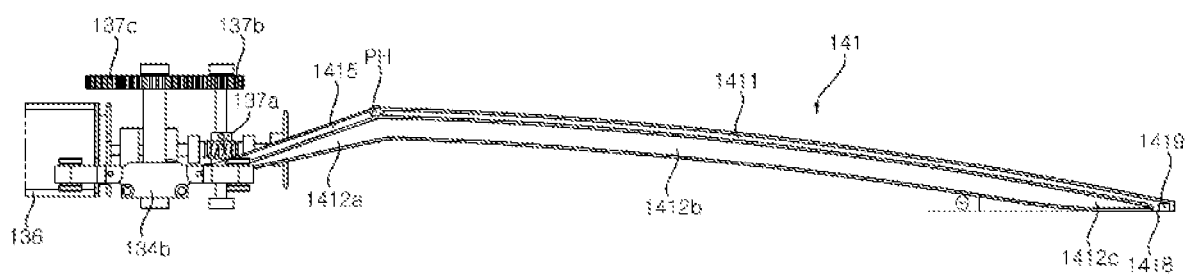

Referring to FIGS. 10 and 11, the wing 141 may include a wing end 1418 and an end rib 1412c. The wing end 1418 may form an end of a wing plate 1411. A thickness of the wing end 1418 may be greater than a thickness of the wing plate 1411.

The end rib 1412c may be referred to as a third rib 1412c. The third rib 1412c may connect the second rib 1412b to the wing end 1418. The third rib 1412c may extend in a longitudinal direction of the second rib 1412b and may be formed on the wing plate 1411.

A longitudinal direction of the third rib 1412c may form a predetermined angle with the longitudinal direction of the second rib 1412b. For example, the longitudinal direction of the second rib 1412b may form an obtuse angle with the longitudinal direction of the third rib 1412c.

An end pin 1419 may be formed at the wing end 1418. The end pin 1419 may protrude from a first end surface and/or a second end surface of the wing end 1418.

Figure 12:
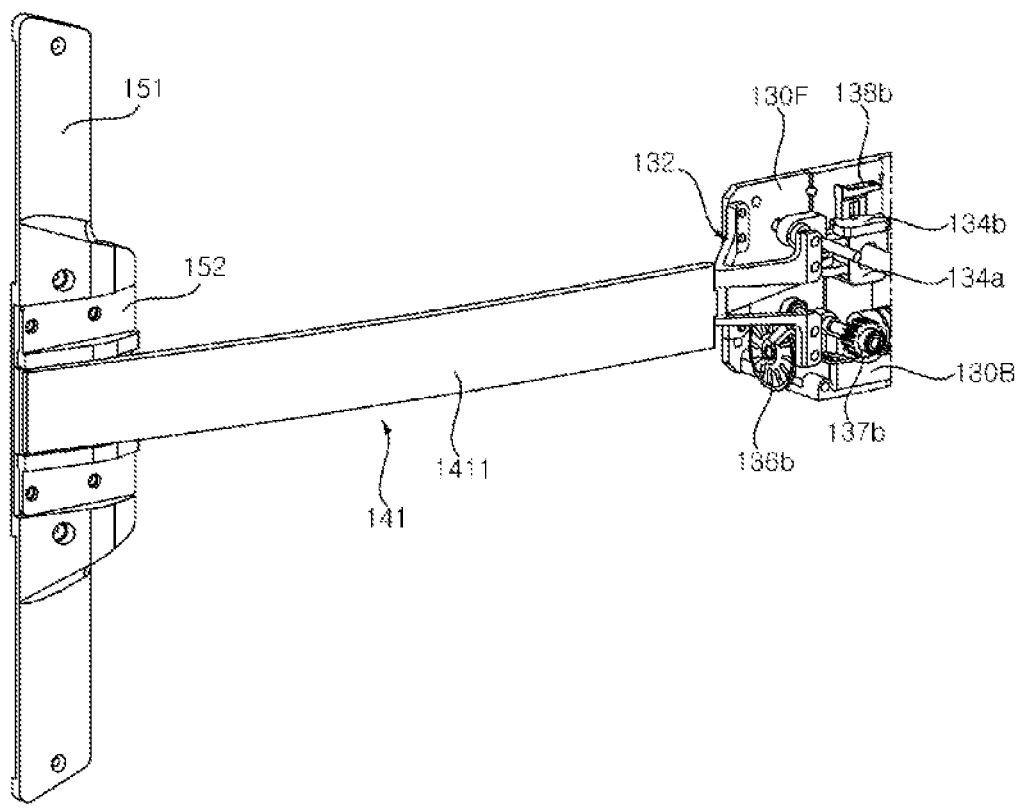
Figure 13:
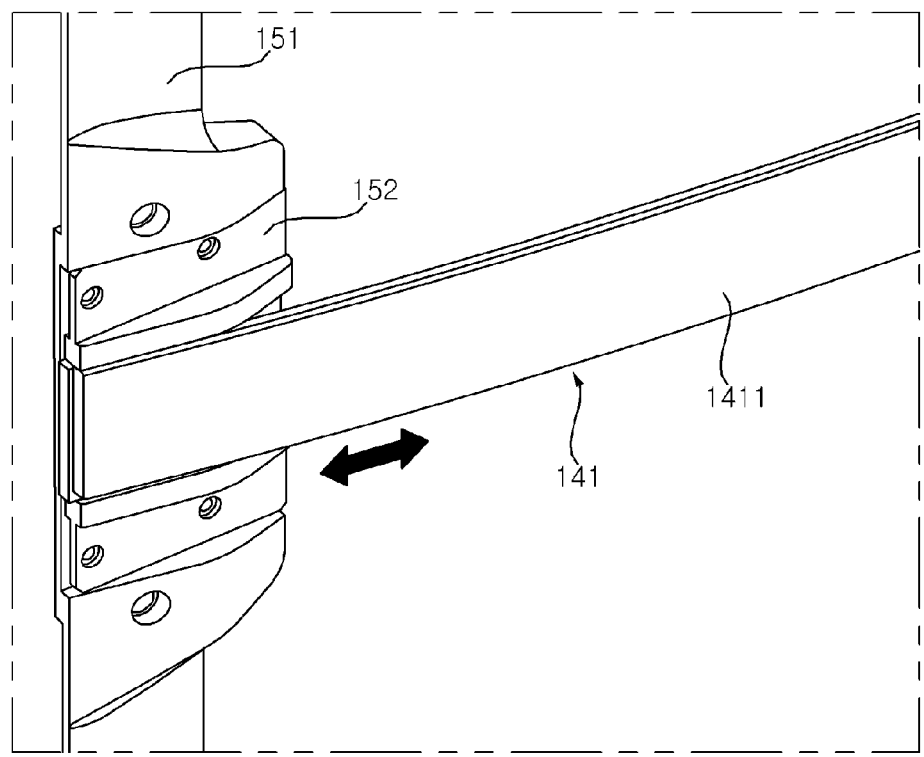
Figure 14:
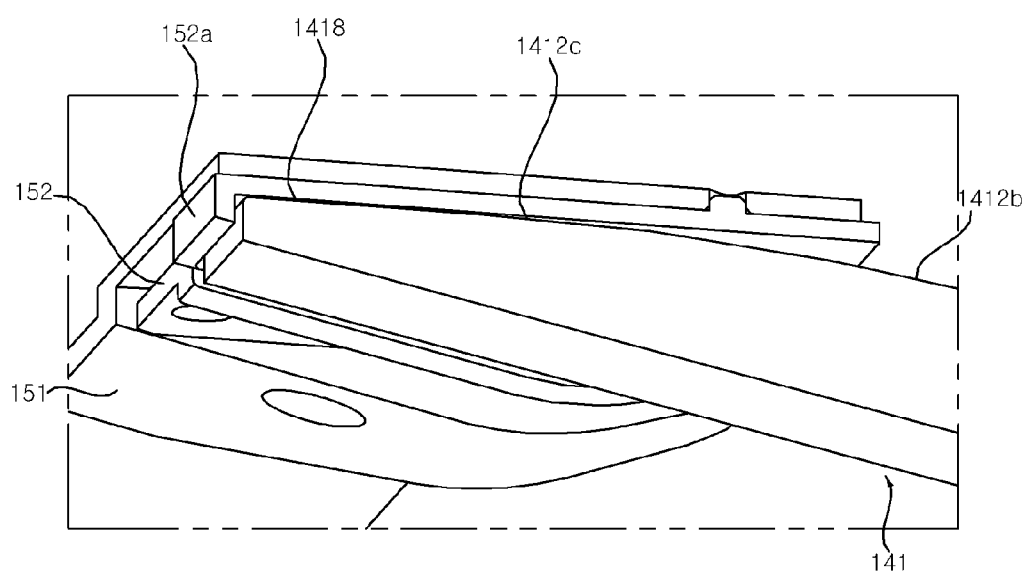

Referring to FIGS. 12 to 14, side frames 151 and 153 (see FIG. 2) may be coupled or fixed to a rear side or a rear surface of the plate 120. The side frame 151 may include a sliding mount 152. The sliding mount 152 may be mounted or fixed onto the side frame 151.

The wing 141 may be coupled to the sliding mount 152 so as to be movable on the sliding mount 152. As the wing 141 moves on the sliding mount 152, the third rib 1412c and the wing end 1418 may come into contact with the sliding mount 152. As the third rib 1412c and the wing end 1418 come into contact with the sliding mount 152, a bending force of the wing 141 to bend the plate 120 may be effectively transmitted.

The sliding mount 152 may include a stopper 152a formed as a bent end. When the plate 120 remains flat, the wing end 1418 may come into contact with the stopper 152a of the sliding mount 152. Accordingly, both ends of the plate 120 are directed toward the rear side of the display device 100, thereby preventing the front surface of the display panel 110 from being convexly curved.

Figure 15:
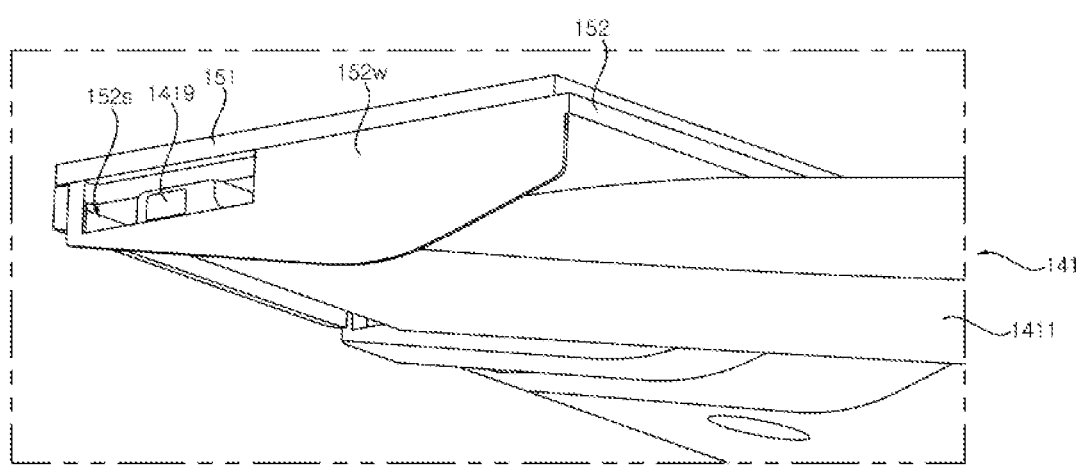
Figure 16:
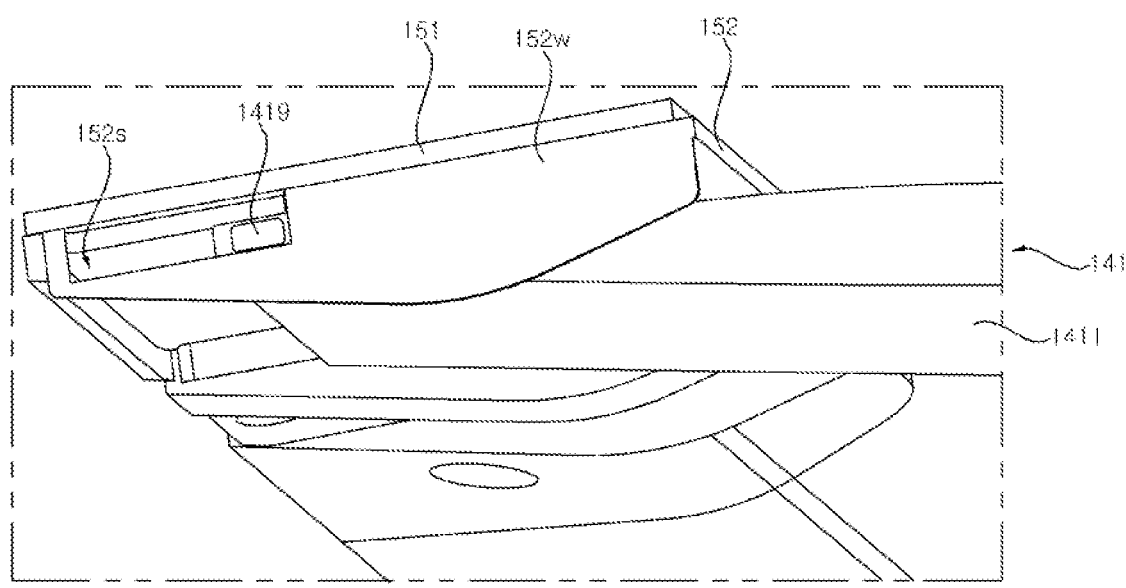

Referring to FIGS. 15 and 16, the sliding mount 152 may include a side wall 152W. The side wall 152W may face a side surface of the wing plate 1411. While moving on the sliding mount 152, the wing plate 1411 may come into contact with the side wall 152W. The side wall 152W may guide movement of the wing plate 1411.

A guide slot 152S may be formed in the side wall 152W. The guide slot 152S may be elongated while passing through the side wall 152W in a longitudinal direction of the wing plate 1411. For example, the guide slot 152S may have a rectangular shape.

The end pin 1419 may be inserted into the guide slot 152S. The end pin 1419 may be moved in the guide slot 152S. Along with the guide slot 152S, the end pin 1419 may limit the movement of the wing plate 1411. For example, the end pin 1419 may have a rectangular cross-section.

Accordingly, a force transmitted by the wing plate 1411 to the side frame 151 may be maintained constant. In addition, the display panel 110 and the plate 120 are curved, thereby improving the problem of flattening of portions adjacent to both ends of the display panel 110 and the plate 120.

Figure 17:
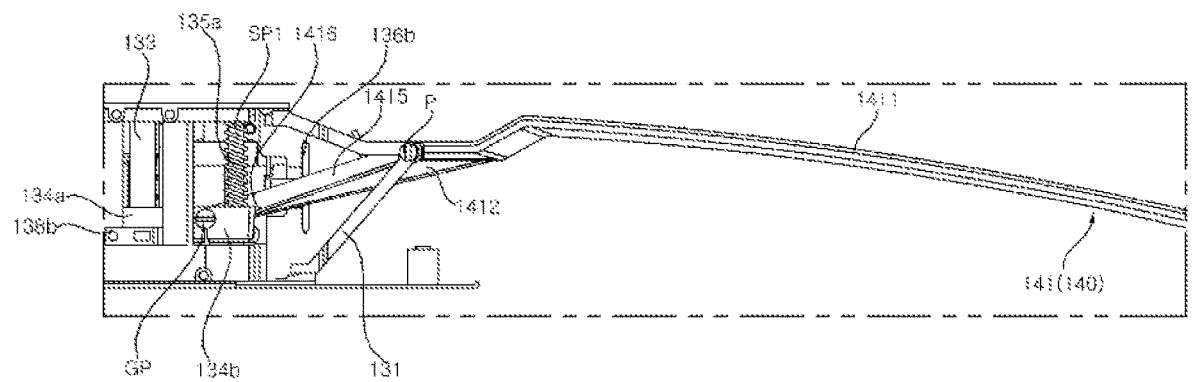
Figure 18:
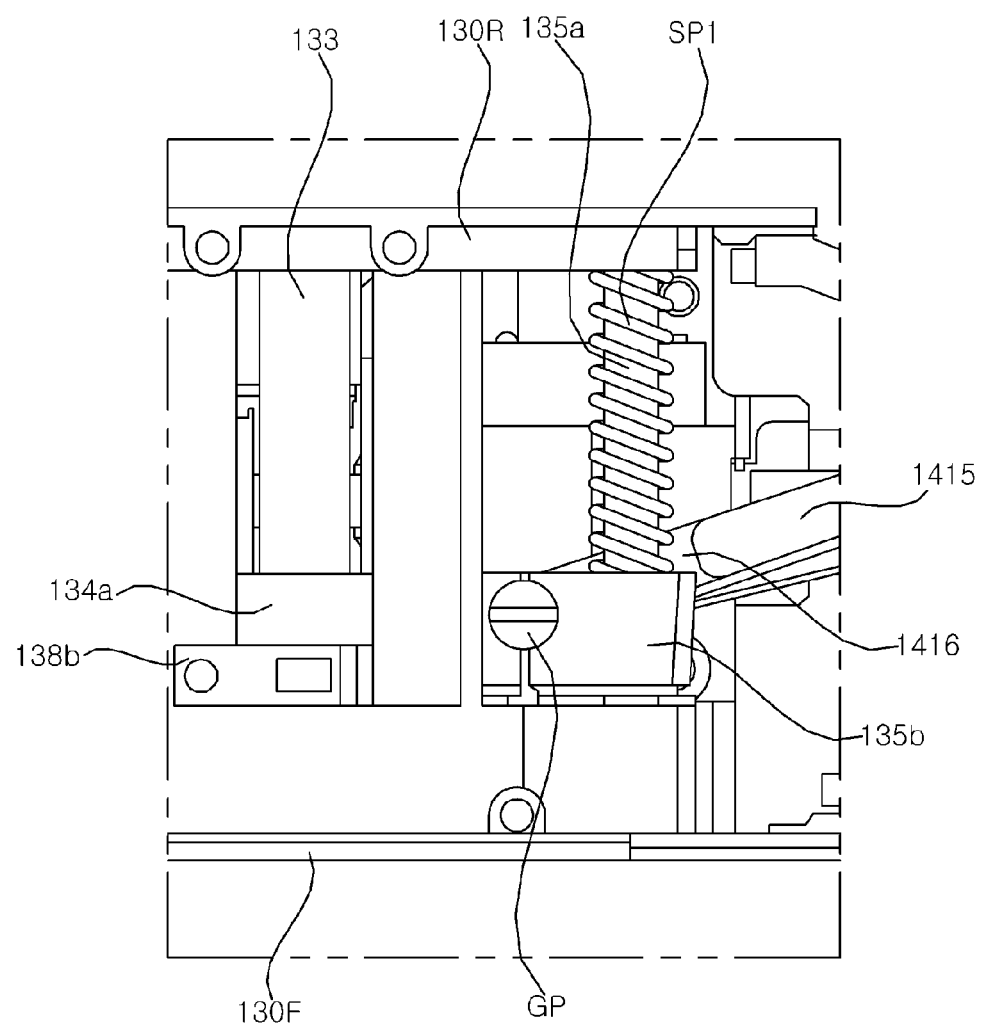

Referring to FIGS. 17 and 18 along with FIG. 9, an elastic member SP1 may be disposed in parallel with the guide shafts 135a and 135b. The elastic member SP1 may be elongated in a moving direction of the slider 134a. The guide shafts 135a and 135b may be inserted into the elastic member SP1. For example, the first guide shaft 135a may be inserted into the elastic member SP1. The elastic member SP1 may be disposed between the slider guide 134b and the rear bracket 130R.

The elastic member SP1 may be referred to as a first elastic member SP1. A first end of the first elastic member SP1 may be supported by the rear bracket 130R, and a second end of the first elastic member SP1 may be supported by the slider guide 134b. The first end of the first elastic member SP1 may be fixed to the rear bracket 130R, and the second end of the first elastic member SP1 may be fixed to the slider guide 134b. The first elastic member SP1 may be fixed to the rear bracket 130R to provide an attractive force to the slider guide 134b.

Accordingly, along with the motor 136 for driving the wing 140 or the wing plate 1411, the first elastic member SP1 may provide an auxiliary driving force to the wing 140 or the wing plate 1411. In addition, even when the motor 136 provides a constant driving force while the wing 140 is driven to make the display panel 110 curved, the motor 136 may respond to a change in force caused during bending of the display panel 110.

For example, when a curvature of the display panel 110 increases, an additional force may be required to bend the display panel 110. In this case, the first elastic member SP1 may provide an auxiliary force to the wing 140, thereby facilitating a later curved operation of the display panel 110.

Figure 19:
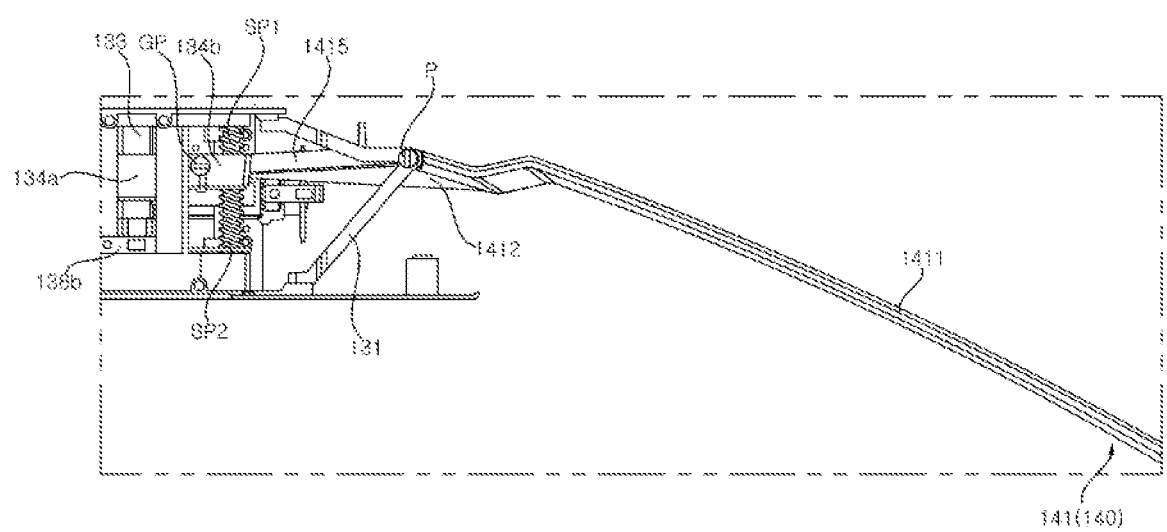
Figure 20:
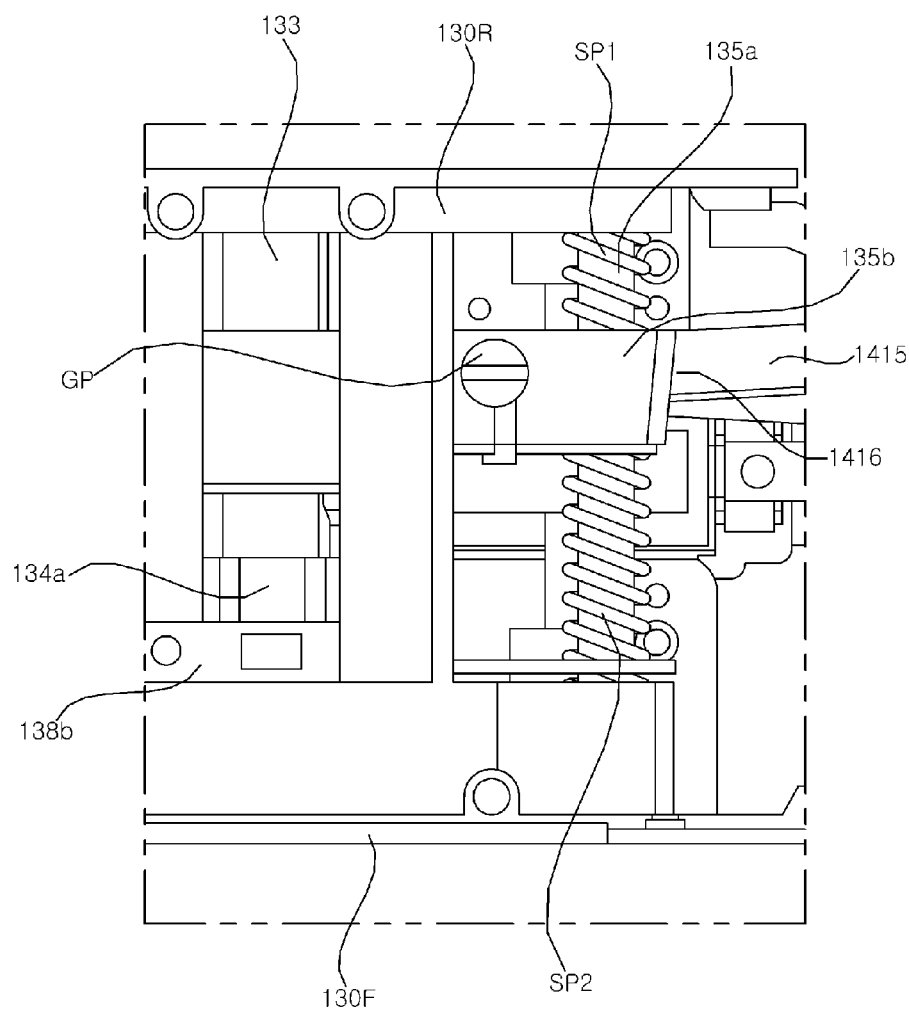

Referring to FIGS. 19 and 20 along with FIG. 9, an elastic member SP2 may be disposed in parallel with the guide shafts 135a and 135b. The elastic member SP2 may be elongated in a moving direction of the slider 134a. The guide shafts 135a and 135b may be inserted into the elastic member SP2. For example, the second guide shaft 135b may be inserted into the elastic member SP2. The elastic member SP2 may be disposed between the slider guide 134b and the front bracket 130F.

The elastic member SP2 may be referred to as a second elastic member SP2. A first end of the second elastic member SP2 may be supported by the front bracket 130F, and a second end of the second elastic member SP2 may be supported by the slider guide 134b. The first end of the second elastic member SP2 may be fixed to the front bracket 130F, and the second end of the second elastic member SP2 may be fixed to the slider guide 134b. The second elastic member SP2 may be fixed to the front bracket 130F to provide a repulsive force to the slider guide 134b.

Accordingly, along with the motor 136 for driving the wing 140 or the wing plate 1411, the second elastic member SP2 may provide an auxiliary driving force to the wing 140 or the wing plate 1411. In addition, even when the motor 136 provides a constant driving force for the wing 140 to make the display panel 110 curved, the motor 136 may respond to a change in force caused by the bending of the display panel 110.

For example, in a section where the display panel 110 starts to be bent from a flat state, a great force may be required to drive the wing 140. In this case, the second elastic member SP2 may provide a force required for initial driving of the wing 140, thereby facilitating an initial curved operation of the display panel 110.

Figure 21:
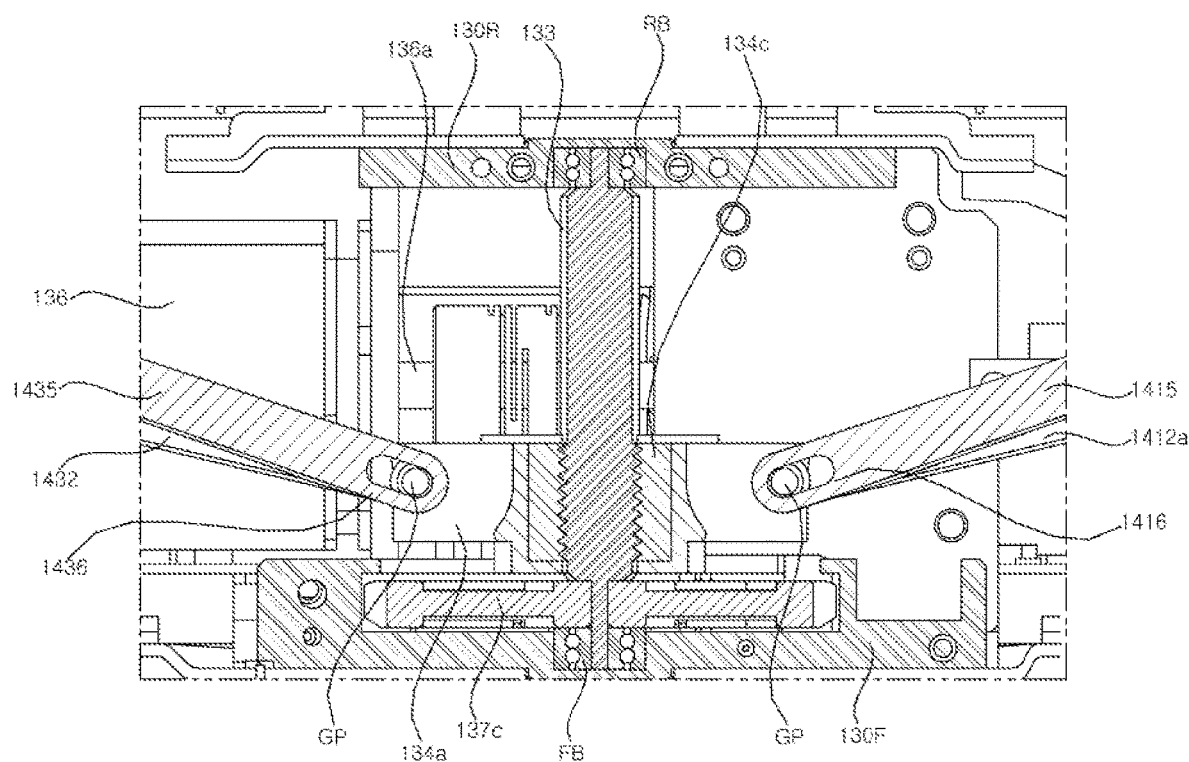

Referring to FIG. 21, when the lead screw 133 is rotated, the slider 134a may move on the lead screw 133. The slider 134a may be screw-coupled to the lead screw 134a. A screw may be formed on an outer surface of the lead screw 133. A middle coupler 134c may be disposed between the lead screw 133 and the slider 134a. The middle coupler 134c may be press-fit into the lead screw 133 and fixed thereto, and may have a screw thread formed on an inner circumferential surface. The inner circumferential surface of the middle coupler 134c may be screw-coupled to an outer circumferential surface of the lead screw 133. For example, the middle coupler 134c may be made of an abrasion resistant material.

A first end of the lead screw 133 may be rotatably coupled to the front bracket 130F, and a second end of the lead screw 133 may be rotatably coupled to the rear bracket 130R. A front bearing FB may be disposed between the first end of the lead screw 133 and the front bracket 130F. A rear bearing RB may be disposed between the second end of the lead screw 133 and the rear bracket 130R. The front bearing FB may be fixed to the front bracket 130F, and the rear bearing RB may be fixed to the rear bracket 130R.

The driving gear 137c may be coupled to the first end of the lead screw 133. The driving gear 137c may come into contact with the front bearing FB. The lead screw 133 may be coupled by a pin to the driving gear 137c.

Accordingly, noise and/or vibrations generated during rotation of the lead screw 133 and the driving gear 137c may be reduced, and rotational stability of the lead screw 133 and the driving gear 137c may be improved.

Figure 22:
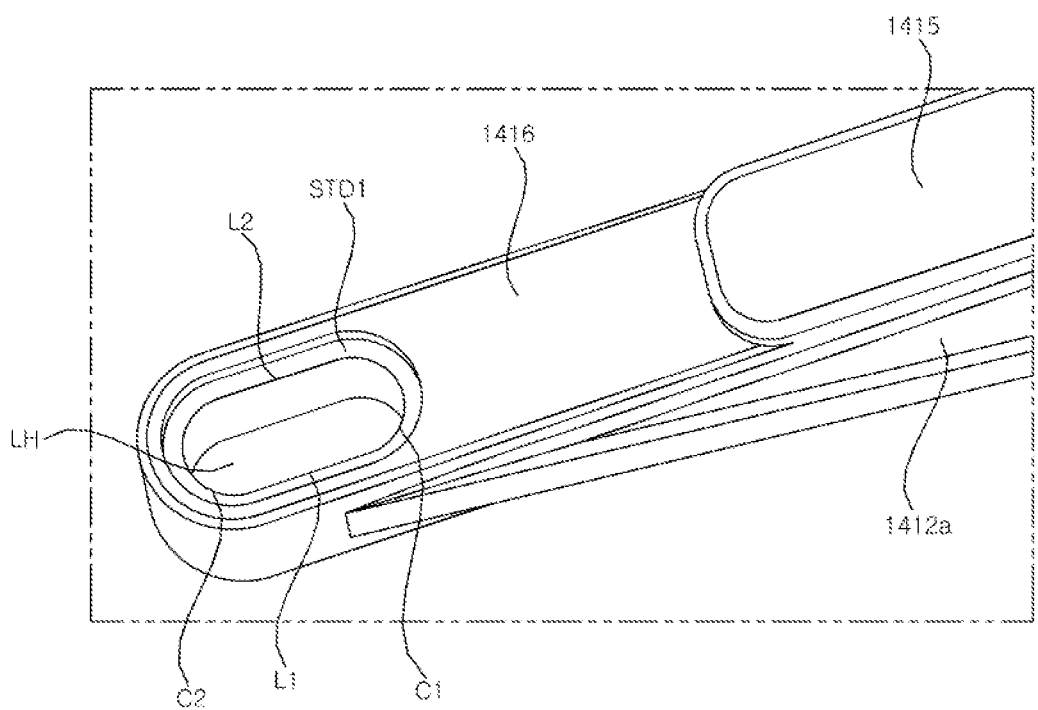
Figure 23:
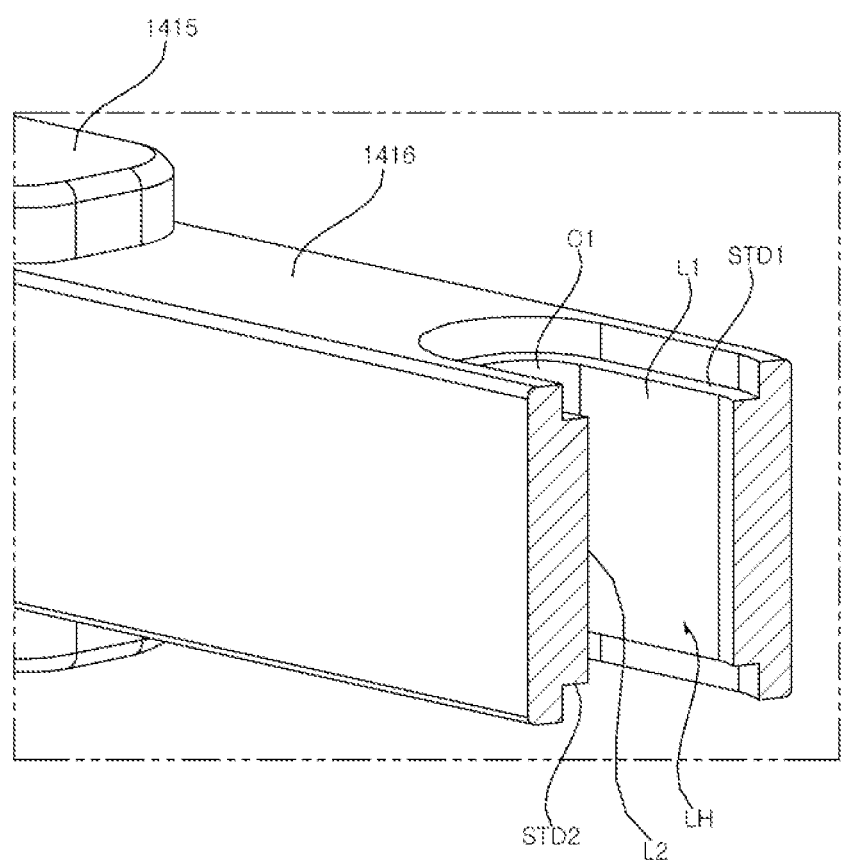

Referring to FIGS. 21 to 23, a long hole LH may be formed in a connecting rod 1416 extending from the lever 1415. The long hole LH may be elongated in the longitudinal direction of the connecting rod 1416. The long hole LH may include a first linear portion L1, a second linear portion L2, a first curved portion C1, and a second curved portion C2. The first linear portion L1 and the second linear portion L2 may face each other or may be disposed opposite each other. The first curved portion C1 and the second curved portion C2 may face each other or may be disposed opposite each other. The first curved portion C1 may connect a first end of the first linear portion L1 and a first end of the second linear portion 2, and the second curved portion C2 may connect a second end of the first linear portion L1 and a second end of the second linear portion L2.

The connecting pin GP formed at or coupled to the slider 134a may be inserted into the long hole LH. A diameter of the connecting pin GP may be substantially equal to a width of the long hole LH. The width of the long hole LH may be a distance between the first linear portion L1 and the second linear portion L2. As the connecting pin GP is moved within the long hole LH, the connecting pin GP and the long hole LH may make a line contact with each other.

The long hole LH may include a first stepped portion STD1 formed adjacent to an opening at a first side of the long hole LH and a second stepped portion STD2 formed adjacent to an opening at a second side thereof.

Figure 24:
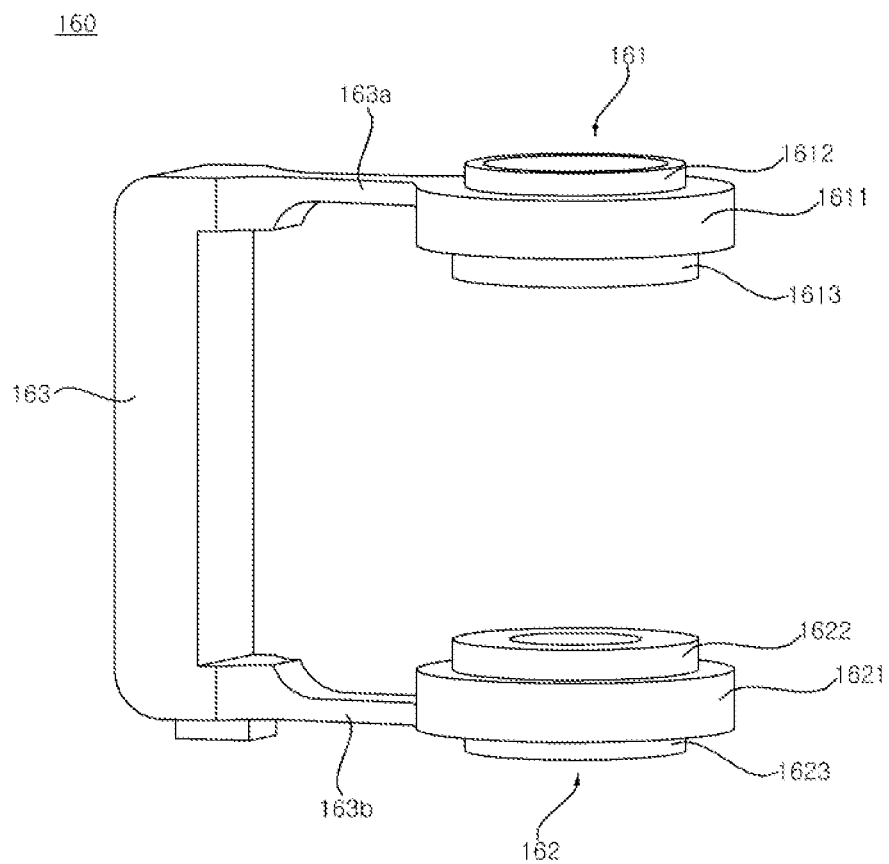

Referring to FIG. 24, a bushing 160 may include a first head 161, a second head 162, and a connecting bar 163. The first head 161 may include a middle layer 1611, an upper layer 1612, and a lower layer 1613. The first head 161 may have a generally cylindrical shape. The middle layer 1611 may be disposed between the upper layer 1612 and the lower layer 1613. A diameter of the middle layer 1611 may be greater than a diameter of the upper layer 1612. The diameter of the middle layer 1611 may be greater than a diameter of the lower layer 1613. The diameter of the lower layer 1613 may be greater than the diameter of the upper layer 1612.

The second head 162 may include a middle layer 1621, an upper layer 1622, and a lower layer 1623. The second head 162 may have a generally cylindrical shape. A size of the second head 162 may be substantially equal to a size of the first head 161. The middle layer 1621 may be disposed between the upper layer 1622 and the lower layer 1623. A diameter of the middle layer 1621 may be greater than a diameter of the upper layer 1622. The diameter of the middle layer 1621 may be greater than a diameter of the lower layer 1623. The diameter of the lower layer 1623 may be smaller than the diameter of the upper layer 1622.

The connecting bar 163 may connect the first head 161 and the second head 162. A first bridge 163a may extend from an upper side of the connecting bar 163 to be connected to the first head 161. A second bridge 163b may extend from a lower side of the connecting bar 163 to be connected to the second head 162.

Figure 25:
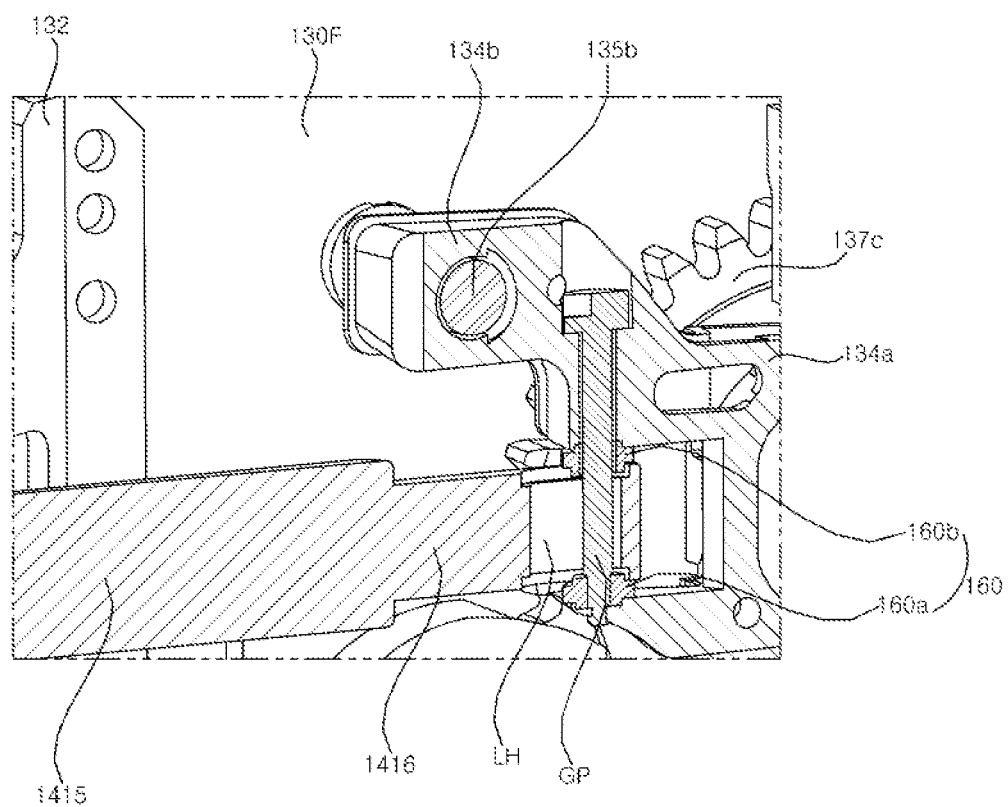

Referring to FIGS. 23 to 25, the busing 160 may be inserted into the long hole LH of the connecting rod 1416. The first head 161 of the bushing 160 may be inserted into an upper opening of the long hole LH, and the second head 162 of the bushing 160 may be inserted into a lower opening of the long hole LH. The lower layer 1613 of the first head 161 may be inserted into the first stepped portion STD1, and the middle layer 1611 of the first head 161 may cover an upper surface of the connecting rod 1416 around the upper opening of the long hole LH. The upper layer 1612 of the first head 161 may be inserted into the slider 134a.

The upper layer 1622 of the second head 162 may be inserted into the second stepped portion STD2, and the middle layer 1621 of the second head 162 may cover a lower surface of the connecting rod 1416 around the lower opening of the long hole LH. The lower layer of the second head 162 may be inserted into the slider 134a.

The connecting pin GP may pass through the first head 161 and the second head 162 to be inserted into the long hole LH of the connecting rod 1416. The connecting pin GP may come into contact with the first head 161 and the second head 162, and when the connecting pin GP is moved in the long hole LH, the bushing 160 may also be moved together with the connecting pin GP. The bushing 160 may come into contact with the connecting rod 1416 and/or the long hole LH.

Accordingly, noise and/or vibrations generated among the slider 134a, the connecting rod 1416, and the connecting pin GP may be suppressed.

Figure 26:
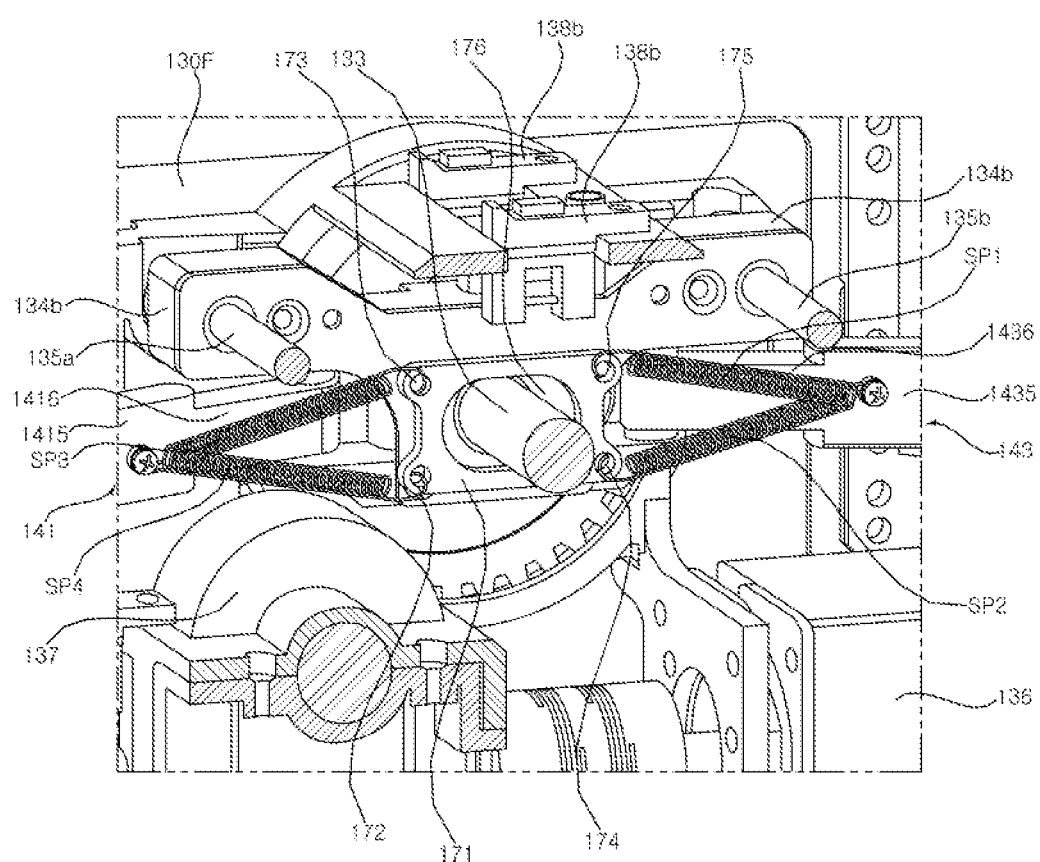
Figure 27:
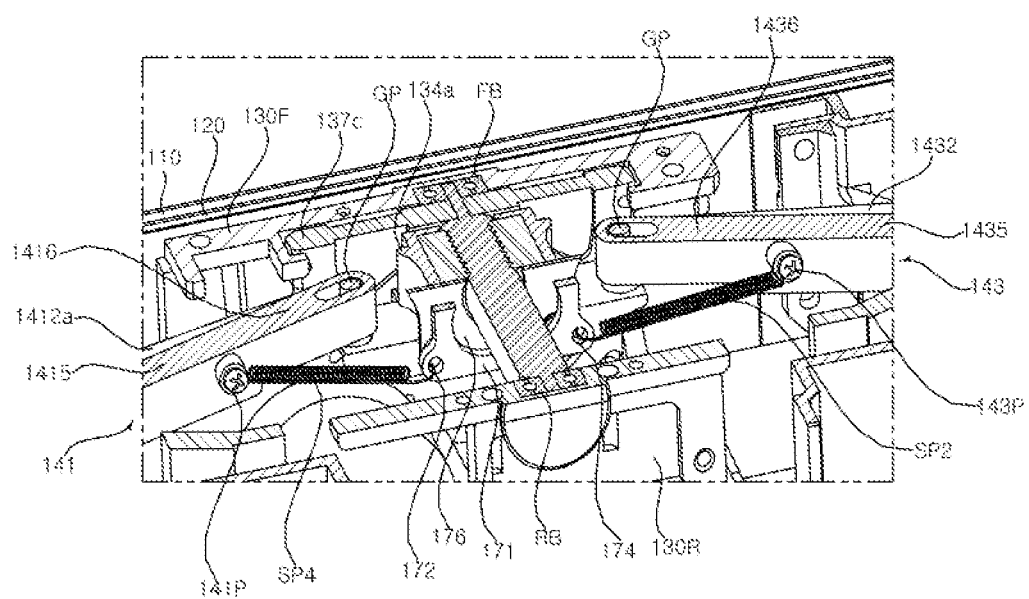

Referring to FIGS. 26 and 27, a center plate 171 may be disposed between the first wing 143 and the second wing 141. The center plate 171 may be disposed between the lever 1435 of the first wing 143 and the lever 1415 of the second wing 141. The center plate 171 may have a hollow opening 176. The opening 176 may be formed by passing through the center plate 171. The lead screw 133 may pass through the opening 176 of the center plate 171. The center plate 171 may be spaced apart from the lead screw 133.

The center plate 171 may have fixing parts 172, 173, 174, and 175. There may be a plurality of fixing parts 172, 173, 174, and 175. The plurality of fixing parts 172, 173, 174, and 175 may be formed at corners of the center plate 171. For example, the center plate 171 may be a rectangular plate, and the plurality of fixing parts 172, 173, 174, and 175 may be formed at the respective corners of the center plate 171.

A first fixing protrusion 143P may be formed on the first wing 143. The first fixing protrusion 143P may protrude from an outer surface of the lever 1435 of the first wing 143. A second fixing protrusion 141P may be formed on the second wing 141. The second fixing protrusion 141P may protrude from an outer surface of the lever 1415 of the second wing 141.

The first elastic member SP1 may connect the first fixing protrusion 143P and the fixing part 175 of the center plate 171. The second elastic member SP2 may connect the first fixing protrusion 143P and the fixing part 174 of the center plate 171. A first end of the first elastic member SP1 and a first end of the second elastic member SP2 may be caught on the first fixing protrusion 143P. A second end of the first elastic member SP1 may be connected to the fixing part 175 on a right upper side of the center plate 171, and a second end of the second elastic member SP2 may be connected to the fixing part 174 on a right lower side of the center plate 171. For example, the first elastic member SP1 and the second elastic member SP2 may be extension springs or high elasticity rubber.

A third elastic member SP3 may connect the second fixing protrusion 141P and the fixing part 173 of the center plate 171. A fourth elastic member SP4 may connect the second fixing protrusion 141P and the fixing part 172 of the center plate 171. A first end of the third elastic member SP3 and a first end of the fourth elastic member SP4 may be caught on the second fixing protrusion 141P. A second end of the third elastic member SP3 may be connected to the fixing part 173 on a left upper side of the center plate 171, and a second end of the fourth elastic member SP4 may be connected to the fixing part 172 on a left lower side of the center plate 171. For example, the third elastic member SP3 and the fourth elastic member SP4 may be extension springs or high elasticity rubber.

The center plate 171 may be spaced apart from the lead screw 133 by the elastic members SP1, SP2, SP3, and SP4. The first wing 143 and the second wing 141 may be aligned with respect to the lead screw 133. The first wing 143 may pull the second wing 141, and the second wing 141 may pull the first wing 143. Accordingly, the first wing 143 and the second wing 141, which pivot as the slider 134a moves, may be maintained in sync. That is, the display device may have a constant curvature.

Figure 28:
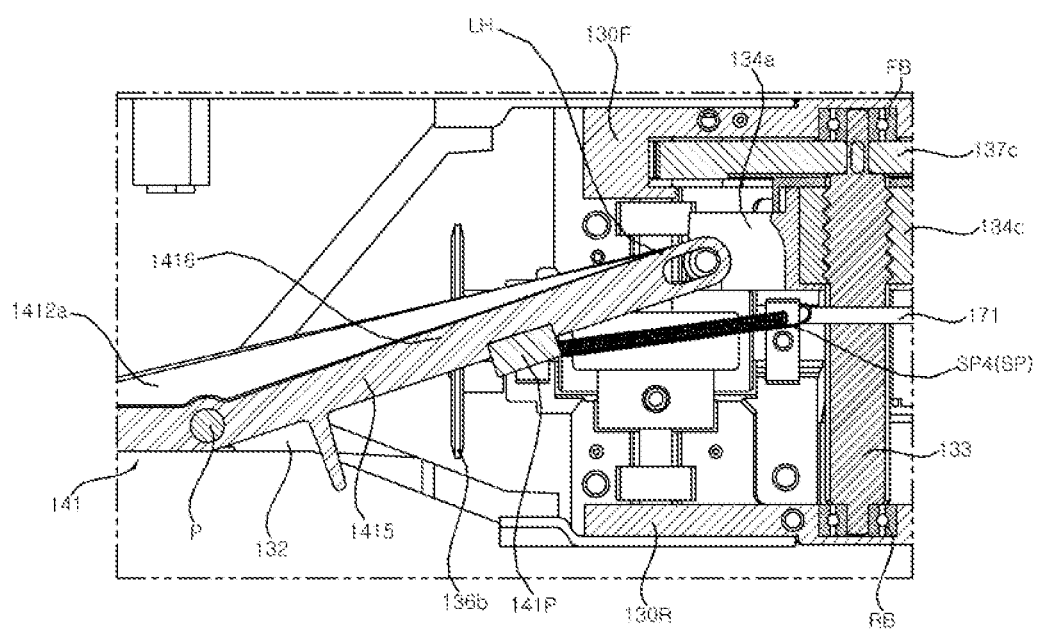
Figure 29:
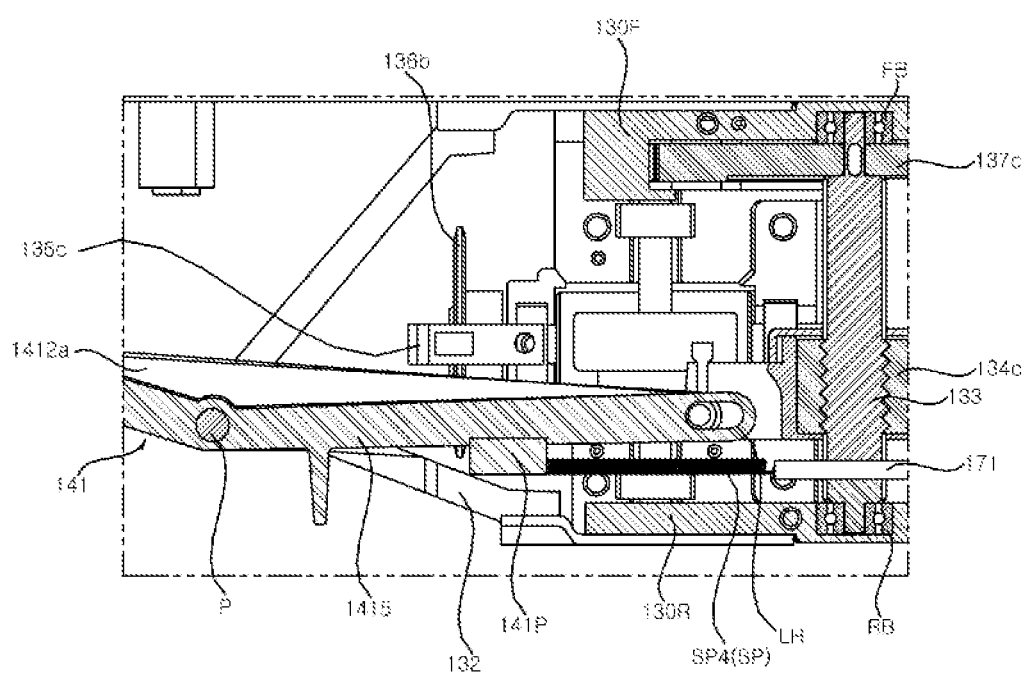

Referring to FIGS. 28 and 29, when the slider 134a is disposed close to the front bracket 130F (see FIG. 28), the long hole LH of the wing 141 may pivot about the pivot shaft P to be located close to the front bracket 130F. In this case, the wing 141 may maintain the display panel 110 in a flat state. In this case, the center plate 171 may pull the wing 141 via the elastic member SP. A position of the center plate 171 may be moved according to the movement of the wing 141 and the slider 134a.

When the slider 134a is disposed close to the rear bracket 130R (see FIG. 29), the long hole LH of the wing 141 may pivot about the pivot shaft P to be located close to the rear bracket 130R. In this case, the wing 141 may allow the display panel 110 to remain curved. In this case, the center plate 171 may pull the wing 141 via the elastic member SP. Here, a pulling force of the center plate 171 to pull the wing 141 via the elastic member SP may be smaller than a pulling force of the center plate 171 to pull the wing 141 described with reference to FIG. 28. That is, the pulling force of the center plate 171 to pull the wing 141 via the elastic member SP may be changed according to a pivot angle of the wing 141.

By varying a force according to the pivot angle of the wing 141 while maintaining the pulling force of the center plate 171 to pull the wing 141 via the elastic member SP, the display panel 110 may be maintained in a curved state with a constant curvature.

Referring to FIGS. 1 to 29, a display device includes: a flexible display panel 110; a flexible plate 120 disposed at a rear of the display panel 110, and coupled to the display panel 110; a driving module 130 coupled to a rear of the plate 120 and having a slider 134a that linearly reciprocates; a first wing 143 elongated with a first end being coupled to the slider 134a and a second end being coupled to the rear of the plate 120, and having a pivot shaft P disposed adjacent to the first end between the first end and the second end; a first wing bracket 131 fixed to the rear of the plate 120 at a position adjacent to the pivot shaft P of the first wing 143, and coupled to the pivot shaft P of the first wing 143; a second wing 141 elongated with a first end being coupled to the slider 134a and a second end being coupled to the rear of the plate 120, and having a pivot shaft P disposed adjacent to the first end between the first end and the second end, to be symmetric to the first wing 143 with respect to the slider 134a; and a second wing bracket 132 fixed to the rear of the plate 120 at a position adjacent to the pivot shaft P of the second wing 141, and coupled to the pivot shaft P of the second wing 141, wherein the driving module 130 includes: a front bracket 130F fixed to the rear of the plate 120; a rear bracket 130R disposed opposite the front bracket 130F; a lead screw 133 elongated from the front bracket 130F to the rear bracket 130R, rotatably coupled to the front bracket 130F or the rear bracket 130R, and rotating to move the slider 134a; a center plate 171 disposed between the rear bracket 130R and the slider 134a; a first elastic member SP connecting the center plate 171 and the first wing 143; and a second elastic member SP connecting the center plate 171 and the second wing 143.

The first elastic member SP may provide a force in a direction different from that of the second elastic member SP.

The first elastic member SP may be fixed to the slider 134a to pull the first wing 143, and the second elastic member SP may be fixed to the slider 134a to pull the second wing 141.

The center plate 171 may have an opening 176, wherein the lead screw 133 may pass through the opening 176 of the center plate 171, and the center plate 171 may be spaced apart from the lead screw 133.

The slider 134a may be screw-coupled to the lead screw 133 to linearly reciprocate.

The driving module 130 may further include: a first guide shaft 135a disposed parallel to the lead screw 133, and fixed to the front bracket 130F or the rear bracket 130R; and a second guide shaft 135b disposed parallel to the lead screw 133, fixed to the front bracket 130F or the rear bracket 130R, and disposed opposite the first guide shaft 135a with respect to the lead screw 133.

The driving module 130 may further include a slider guide 134b, into which the first guide shaft 135a and the second guide shaft 135b are inserted such that the slider guide 134b is movable on the first guide shaft 135a and the second guide shaft 135b, and which is fixed to the slider 134a.

The wing brackets 131 and 132 may further include: upper brackets 131a and 132a disposed at an upper side of the wings 141 and 143; lower brackets 131b and 132b disposed at a lower side of the wings 141 and 143; and a pin P connecting the upper brackets 131a and 132a and the lower brackets 131b and 132b and inserted into the pivot shaft P of the wings 141 and 143.

The second wing 141 may have a long hole LH formed in one end, wherein the slider 134 may have a connecting pin GP inserted into the long hole LH of the second wing 141, wherein a width of the long hole LH may be substantially equal to a diameter of the connecting pin GP, and a length of the long hole LH may be greater than the diameter of the connecting pin GP.

The second wing 141 may include: a first stepped portion STD1 formed at an opening on a first side of the long hole LH; and a second stepped portion STD2 formed at an opening on a second side of the long hole LH.

The display device may further include a bushing 160 which includes a first head 161 having the connecting pin GP inserted therein and coming into contact with the first stepped portion STD1, and a second head 162 having the connecting pin GP inserted therein and coming into contact with the second stepped portion STD2.

The bushing 160 may further include a connection bar 163 connecting the first head 161 and the second head 162, wherein: the first head 161 may include a middle layer 1611 coming into contact with an outer surface of the wing 141 on which the first stepped portion STD1 is formed, and a lower layer 1613 connected to the middle layer 1611 and coming into contact with the first stepped portion STD1; and the second head 162 may include a middle layer 1621 coming into contact with an outer surface of the wing 141 on which the second stepped portion STD2 is formed, and an upper layer 1622 connected to the middle layer 1621 and coming into contact with the second stepped portion STD2.

The first head 161 may further include an upper layer 1612 connected to the middle layer 1611 of the first head 161 and inserted into the slider 134a; and the second head 162 may further include a lower layer 1623 connected to the middle layer 1621 of the second head 162 and inserted into the slider 134a.

A diameter of the middle layer 1611 of the first head 161 may be greater than a diameter of the lower layer 1613 of the first head 161; and a diameter of the middle layer 1621 of the second head 162 may be greater than a diameter of the upper layer 1622 of the second head 162.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device comprising:
a flexible display panel;
a flexible plate disposed at a rear of the display panel, and coupled to the display panel;
a driving module coupled to a rear of the plate and having a slider that linearly reciprocates;
a first wing elongated with a first end being coupled to the slider and a second end being coupled to the rear of the plate, and having a first pivot shaft disposed adjacent to the first end between the first end and the second end;
a first wing bracket fixed to the rear of the plate at a position adjacent to the first pivot shaft of the first wing, and coupled to the first pivot shaft of the first wing;
a second wing elongated with a first end being coupled to the slider and a second end being coupled to the rear of the plate, and having a second pivot shaft disposed adjacent to the first end between the first end and the second end, the second wing being symmetric to the first wing with respect to the slider; and
a second wing bracket fixed to the rear of the plate at a position adjacent to the second pivot shaft of the second wing, and coupled to the second pivot shaft of the second wing,
wherein the driving module comprises:
a front bracket fixed to the rear of the plate;
a rear bracket disposed opposite the front bracket;
a lead screw elongated from the front bracket to the rear bracket, rotatably coupled to the front bracket or the rear bracket, and rotating to move the slider;
a center plate disposed between the rear bracket and the slider;
a first elastic member connecting the center plate and the first wing; and
a second elastic member connecting the center plate and the second wing.

2. The display device of claim 1, wherein the first elastic member provides a force in a direction and the second elastic member provides a force in a direction different from the direction of the force provided by the first elastic member.

3. The display device of claim 2, wherein the first elastic member is fixed to the slider to pull the first wing, and the second elastic member is fixed to the slider to pull the second wing.

4. The display device of claim 1, wherein the center plate has an opening,
wherein the lead screw passes through the opening of the center plate, and the center plate is spaced apart from the lead screw.

5. The display device of claim 4, wherein the slider is screw-coupled to the lead screw to linearly reciprocate.

6. The display device of claim 1, wherein the driving module further comprises:
a first guide shaft disposed parallel to the lead screw, and fixed to the front bracket or the rear bracket; and
a second guide shaft disposed parallel to the lead screw, fixed to the front bracket or the rear bracket, and disposed opposite the first guide shaft with respect to the lead screw.

7. The display device of claim 6, wherein the driving module further comprises a slider guide, into which the first guide shaft and the second guide shaft are inserted such that the slider guide is movable on the first guide shaft and the second guide shaft, and the slider guide fixed to the slider.

8. The display device of claim 1, wherein the wing brackets further comprise:
upper brackets disposed at an upper side of the wings;
lower brackets disposed at a lower side of the wings; and
a pin connecting the upper brackets and the lower brackets and inserted into the first and/or the second pivot shaft of the wings.

9. The display device of claim 1, wherein the second wing has a long hole formed in one end,
    wherein the slider has a connecting pin inserted into the long hole of the second wing,
    wherein a width of the long hole is substantially equal to a diameter of the connecting pin, and a length of the long hole is greater than the diameter of the connecting pin.

10. The display device of claim 9, wherein the second wing comprises:
    a first stepped portion formed at an opening on a first side of the long hole; and
    a second stepped portion formed at an opening on a second side of the long hole.

11. The display device of claim 10, further comprising a bushing into which the connecting pin is inserted, the bushing includes a first head in contact with the first stepped portion, and a second head in contact with the second stepped portion.

12. The display device of claim 11, wherein the bushing further comprises a connection bar connecting the first head and the second head,
    wherein:
        the first head comprises a first middle layer in contact with an outer surface of the wing on which the first stepped portion is formed, and a lower layer connected to the middle layer and being in contact with the first stepped portion; and
    the second head comprises a second middle layer in contact with an outer surface of the wing on which the second stepped portion is formed, and an upper layer connected to the middle layer and being in contact with the second stepped portion.

13. The display device of claim 12, wherein:
the first head further comprises an upper layer connected to the first middle layer of the first head and inserted into the slider; and
the second head further comprises a lower layer connected to the second middle layer of the second head and inserted into the slider.

14. The display device of claim 13, wherein:
a diameter of the first middle layer of the first head is greater than a diameter of the lower layer of the first head; and
a diameter of the second middle layer of the second head is greater than a diameter of the upper layer of the second head.

\* \* \* \* \*